(12) United States Patent
Bunnelle et al.

(10) Patent No.: US 7,220,800 B2
(45) Date of Patent: May 22, 2007

(54) WATER SOLUBLE CONTACT LENS BLOCKING COMPOSITION WITH ABSORBENT DISINTEGRANT

(75) Inventors: William L. Bunnelle, Ham Lake, MN (US); Robert M. Hume, III, Woodbury, MN (US)

(73) Assignee: Adherent Laboratories, Inc., Woodbury, MN (US)

( * ) Notice: Subject to any disclaimer, the term of this patent is extended or adjusted under 35 U.S.C. 154(b) by 169 days.

(21) Appl. No.: 11/043,407

(22) Filed: Jan. 26, 2005
(Under 37 CFR 1.47)

(65) Prior Publication Data
US 2005/0234168 A1    Oct. 20, 2005

Related U.S. Application Data

(63) Continuation-in-part of application No. 10/816,748, filed on Apr. 2, 2004.

(51) Int. Cl.
*C08L 33/24*    (2006.01)

(52) U.S. Cl. .................. 525/218; 351/162; 351/163; 525/100; 528/25

(58) Field of Classification Search ............... 351/162, 351/163; 525/100, 218; 528/25
See application file for complete search history.

(56) References Cited

U.S. PATENT DOCUMENTS

| | | | |
|---|---|---|---|
| 3,221,378 A | 12/1965 | Faas et al. | |
| 3,451,177 A | 6/1969 | Buckminster et al. | |
| 3,867,519 A | 2/1975 | Michaels | |
| 4,534,878 A | 8/1985 | Ellis et al. | |
| 4,830,783 A | 5/1989 | Ellis et al. | |
| 4,980,993 A | 1/1991 | Umezaki | |
| 5,082,734 A | 1/1992 | Vaughn | |
| 5,145,596 A | 9/1992 | Blank et al. | |
| 5,275,861 A | 1/1994 | Vaughn | |
| 5,290,572 A | 3/1994 | MacKeen | |
| 5,360,419 A | 11/1994 | Chen et al. | |
| 5,429,874 A | 7/1995 | VanPutte | |
| 5,459,184 A | 10/1995 | Bunnelle et al. | |
| 5,607,475 A | 3/1997 | Cahalan et al. | |
| 5,612,384 A | 3/1997 | Ross et al. | |
| 5,635,239 A | 6/1997 | Chen et al. | |
| 5,643,992 A | 7/1997 | Northey | |
| 5,714,159 A | 2/1998 | Shalaby | |
| 5,794,498 A | 8/1998 | Chaloux | |
| 5,847,013 A | 12/1998 | Ross et al. | |
| 5,891,956 A | 4/1999 | Smith et al. | |
| 5,931,068 A | 8/1999 | Council, Jr. et al. | |
| 5,990,065 A | 11/1999 | Vinson et al. | |
| 5,998,492 A | 12/1999 | Haar, Jr. et al. | |
| 6,012,818 A | 1/2000 | Araki | |
| 6,034,168 A | 3/2000 | Wang | |
| 6,069,122 A | 5/2000 | Vinson et al. | |
| 6,103,809 A | 8/2000 | Ahmed et al. | |
| 6,192,986 B1 | 2/2001 | Urlwin-Smith | |
| 6,271,278 B1 | 8/2001 | Park et al. | |
| 6,276,994 B1 | 8/2001 | Yoshida et al. | |
| 6,277,479 B1 | 8/2001 | Campbell et al. | |
| 6,315,650 B1 | 11/2001 | Council, Jr. et al. | |
| 6,406,797 B1 | 6/2002 | VanPutte | |
| 6,410,627 B1 | 6/2002 | Paul et al. | |
| 6,428,900 B1 | 8/2002 | Wang | |
| 6,441,089 B1 | 8/2002 | Smith et al. | |
| 6,479,222 B1 | 11/2002 | Jones et al. | |
| 6,566,374 B1 | 5/2003 | Keene et al. | |
| 6,582,762 B2 | 6/2003 | Faissat et al. | |
| 6,586,499 B2 | 7/2003 | Bonafini, Jr. et al. | |
| 6,612,462 B2 | 9/2003 | Sosalla et al. | |
| 6,652,886 B2 | 11/2003 | Ahn et al. | |
| 2003/0119944 A1 | 6/2003 | Bonafini, Jr. et al. | |
| 2003/0203849 A1* | 10/2003 | Araki et al. ............... | 514/17 |

OTHER PUBLICATIONS

Material Safety Data Sheet for AQUAZOL® 5/50/200/500, Polymer Chemistry Innovations, Inc., 7 pages.
"Insert Blocking System", Roy Dorey, Technical Manager Lamda Polytech Limited, No. 23, 1999, pp. 19-20.
Products & Offerings, Blocker System, MicroOptics Design Corporation, 1 page.

* cited by examiner

*Primary Examiner*—Terressa Boykin
(74) *Attorney, Agent, or Firm*—Merchant & Gould P.C.

(57) ABSTRACT

A contact lens blocking composition with desirable melt properties can comprise a water soluble polymer such as a polyalkylpolyimine combined with an absorbent disintegrant or with a filler such as a highly soluble salt composition or both. The blocking composition can be readily removed from a shaped contact lens after machining and from the mandrel or other tool used in shaping the lens. The blocking composition is readily removed using an aqueous wash, aqueous washing solutions or ultrasonic cleaning procedures.

38 Claims, No Drawings

WATER SOLUBLE CONTACT LENS BLOCKING COMPOSITION WITH ABSORBENT DISINTEGRANT

RELATED APPLICATION

This application is a continuation-in-part application of U.S. Ser. No. 10/816,748 filed Apr. 2, 2004 which is expressly incorporated by reference herein.

FIELD OF THE INVENTION

The compositions of the invention can be used as a contact lens blocking compound in which a lens blank in the form of a button or disk is mounted into a cutting or shaping machine with the blocking compound for the purpose of machine shaping the blank into a contact lens. The blocking compound of the invention is a water-soluble thermoplastic material that is convenient to apply, maintains an adequate mechanical positioning of the contact lens button, blank or disk for machining purposes but is readily removed with simple aqueous cleaning solutions, or simply hot water, once the lens is fully shaped. The invention relates to a composition and methods of using the composition.

BACKGROUND OF THE INVENTION

Both hard and soft contact lenses are typically manufactured by obtaining a contact lens blank in the form of a button or disk (hereinafter "blank"). The plastic lens blank is made by polymerizing a monomer mixture. The blank is machined into an optical shape providing a fixed correction (front curve and base curve) for the user's eye. The contact lens blank is shaped into the optical form by machining the blank. One common method is to use a cutting tool or lathe that removes sufficient material from either or both sides of the blank to give the plastic material the characteristic optical shape, a front curve and base curve, relating to its degree and strength of correction. In order to shape the blank, the material must be connected to a lathe or other machine and then cut. The machining must be done carefully, since the tolerances relating to the correction require careful control of the ultimate dimensions. With this in mind, the blank must be held in its position in a very stable and predictable location. The most common shaping method is to imbed the blank in a conventional "blocking wax" on a mandrel or other holder mechanism. The blocking compound holds the blank in a fixed unmoving position with respect to the cutting edge and can aid in attaining a desired shape. In this way, both the front curve and the base curve can be cut with great accuracy and the correction of the lens can be set using the typically computer controlled machining parameters. In typical contact lens manufacture, a mandrel is dipped into melt blocking wax and is then manually wiped free of excess material. The contact lens is then imbedded into the adhesive and then mounted on a jig on the shaping machine.

Conventional blocking compounds also called "waxes" for holding a contact lens blank in position on a lathe have been typically aqueous insoluble organic thermoplastic materials. These materials require non-aqueous solvent removal and cleaning once the lathing, machining or other shaping steps are completed. In such a cleaning method, the contact lens and at least some of its blocking compound, along with the mandrel, in certain instances, are immersed in organic solvent such as 1,1,1-trichloroethylene, chloroform, cyclohexanone or other such organic solvent material. While the solvent adequately removes the material from the contact lens and mandrel, the resulting solution of blocking wax in solvent is hazardous waste and employee contact with the solvent can be irritating or disagreeable to the user.

Somewhat more recently, water-soluble blocking materials have been proposed. Bonafini, Jr. et al., U.S. Patent Publication No. 2003/0119944 A1 teach a blocking wax composition comprising a variety of water soluble typically PEG polymeric materials and from about 10 to 50 wt % of a discontinuous solid phase. The solid phase suggested by Bonafini, Jr. et al. includes aluminum oxide ($Al_2O_3$), calcium oxide ($CaCO_3$), titanium oxide ($TiO_2$), silicon oxide ($SiO_2$) and similar aqueous insoluble materials. The materials disclosed by Bonafini, Jr. et al., while water soluble, are based on polyethylene glycol polymers. Such materials have super cooling characteristics and do not readily solidify at low temperatures passing through a super cooled liquid phase. This characteristic of PEG based materials make them unsuitable for contact lens manufacture due to the delay in solidification and the uncertainty in maintaining the contact lens in the appropriate position.

Bunnelle et al., U.S. Pat. No. 5,459,184, teach a moisture actuated hot melt adhesive. The material suggested by Example IV in Bunnelle et al. is a material having a melting point substantially greater than 170° F. Such high melting materials pose problems when used by the operating personnel, since materials of that temperature are not easily dealt with when used in the manual techniques common in today's contact lens manufacturing procedure. Lower temperature melt materials are required for comfort and safety of operating technicians. Neither Bunnelle et al. or Bonafini, Jr. et al. suggest the use of a material that will rapidly solidify at relatively low temperatures and that will remain substantially liquid at modest elevated temperatures in the range of about 135–170° F. promoting rapid and efficient mounting of contact lens in the blocking material and machining the material into a useful lens. In Bunnelle et al., at Column 9, Example IV, is a contact lens blocking or mounting composition comprising a base polymer, hydrophilic additives and a filler such as calcium carbonate. On the whole, Bunnelle et al. suggest a specific polyalkyleneimine polymer, additive materials that have some hydrophilicity combined with a plasticizer and an aqueous insoluble filler. Fillers discussed in the Bunnelle et al. application include calcium carbonate ($CaCO_3$), zinc oxide (ZnO), alumina ($Al_2O_3X$), clay, titanium dioxide ($TiO_2$), talc, carbon black ($C^0$) and other similar substantially aqueous insoluble filler materials.

Super absorbent, absorbent or water swellable anionic polymers are used in certain consumer articles and in industrial applications. These typically comprise crosslinked acrylic copolymers of alkali metal salts of acrylic acid and acrylamide or other hydrophilic monomers such as 2-acrylamido-2-methylpropanesulfonic acid.

Neither Bunnelle et al. nor Bonafini, Jr. et al. suggest the use of SAP materials or water soluble filler materials. The blocking materials suggested by Bunnelle et al. and Bonafini, Jr. et al. have some utility in contact lens manufacture, but appear to be slow in dissolving in warm water and tend to require substantial time for a fully cleaned contact lens to be obtained after immersion in either warm water or aqueous cleaning solutions. In particular, we have observed that, upon immersion of blocking compounds such as that shown in Bunnelle et al., the material slowly dissolves but remains mechanically intact even as the final materials are removed by the cleaning solution.

A substantial need exists for a blocking compound that can be used by contact lens technicians without discomfort caused by excess melt temperatures and using materials that rapidly solidify to maintain the contact lens in the right position. Further, the contact lens blocking compound can be easily removed by the action of water or other aqueous cleaning solutions in a rapid process. The ideal materials will, upon contact with water, absorb water, become mechanically compromised and quickly break apart and become rapidly removed from the surface of the lens materials.

BRIEF DESCRIPTION OF THE INVENTION

We have found a new useful contact lens blocking composition, involving a blend of water-soluble polymer materials, hydroxy compound and an absorbent disintegrant or a water soluble inorganic filler. The composition has a melting point compatible with manual handling of the melt form of the blocking compound and contact lens materials. The blocking compound is solid at a temperature that ranges from about ambient up to about 130° F. or less and acts as a mechanically stable, predictable blocking compound. We have also found that a small, but effective amount of a surfactant material, blended with the water soluble polymer and filler material enhances cleanability of the blocking compound from the contact lens material or from the mandrel or other tool used in contact lens manufacture.

We have also found that a blocking compound that can be made more easily dissolvable or removable from the formed contact lens and any associated tool by combining the polymer with an absorbent disintegrant or a highly soluble salt. The absorbent material quickly absorbs substantial quantities of water and swells. The mechanical action of swelling acts to disrupt the blocking material, adds surface area and speeds the action of aqueous dissolution. We have found that the salt material, alone or in composition with the absorbent disintegrant, particularly if selected with an appropriate small particle size, causes the blocking compound to rapidly absorb water into the interior of the blocking material structure, rapidly softens the blocking compound and causes the blocking compound to fail mechanically before it is fully solubilized. The salt and the absorbent disintegrant can each act separately to speed disintegration of the blocking compound. The absorbent disintegrant and the salt can also work together and speed blocking compound removal. As a result, the softened, mechanically unstable material can be readily removed from the contact lens by warm water, aqueous cleaning solutions. The material is readily removed when exposed to ultrasonic cleaning conditions. In particular, the ultrasonic cleaning conditions tend to enhance the break-up of the blocking compound containing an absorbent disintegrant or a water soluble salt in such a rapid fashion that the contact lens material can be formed substantially free of blocking compound in a very short period of time substantially before the blocking compound is fully solubilized.

The exceptionally easily removable blocking composition can comprise a water-soluble organic polymer material combined with an absorbent disintegrant or a highly water soluble salt. In general, the water soluble salts we have found useful are sodium or potassium salts of strong acids. A strong acid is one that has a pKa greater than 5, often greater than 2. Such acids can produce a pH less than 4 in a 0.1 N aqueous solution. For the purpose of this disclosure the term "highly soluble salt" refers a material having solubility greater than 1 gram in a liter of water.

The term "absorbent disintegrant" as used in describing a component of the easily removable blocking composition can comprise a water-insoluble organic anionic polymer material in small particulate form that can absorb at least 50 wt-% water and swell in size due to the absorbed water.

DETAILED DISCUSSION OF THE INVENTION

We have found blocking compound formulations of the water soluble polymer disclosed in the invention, an appropriate amount an absorbent disintegrant or an inorganic filler that can provide the thermal properties required in the manufacture of the contact lens adhesive providing comfort and safety to operators while obtaining a fixed and mechanically stable mounting of the contact lens in the shaping machines. We have found formulations of the water-soluble polymer with an appropriate amount of hydroxy organic compound and an absorbent disintegrant or an inorganic filler that can provide the properties needed in the blocking composition. The compositions of the invention can contain the large variety of water-soluble polymers and an absorbent disintegrant or an inorganic filler, preferably a soluble salt material.

In sharp contrast to the prior art materials, the materials rapidly melt at elevated temperatures to produce a material that can easily be applied to the mandrels, but cool rapidly to form a solid mounting material that, once contact lens manufacture is completed, can be readily removed using aqueous solutions, ultrasonic cleaning and other techniques.

We have found that the combination of the water soluble polymer and the absorbent disintegrant or highly soluble salt provides a material that rapidly absorb water and become mechanically unstable, literally falling apart upon application of an aqueous cleaning solutions and particularly when exposed to ultrasonic cleaning conditions. The blocking composition can use a combination of both the soluble filler and the absorbent disintegrant. We have found that a small, but effective, amount of surfactant material can also enhance cleanability of the materials.

The contact lens blocking composition can comprise an aqueous soluble polymer material. A first aspect of the invention comprises a water-soluble polymer combined with an absorbent disintegrant or a highly soluble sodium or potassium salt of a strong acid that can be used in a micronized form. A second aspect of the invention involves a water soluble polyethylene imine polymer with an absorbent disintegrant or a soluble filler. A third aspect involves a water soluble polyethylene imine polymer combined with a hydroxy organic compound and an absorbent disintegrant or an inorganic aqueous soluble filler formulated such that its melt properties provide a fluid polymer material at temperatures greater than about 160° F. and a solid stable blocking compound at temperatures less than 130° F. Since the operating personnel often come into direct contact with melt blocking material, it is useful to have a material with a melting point and substantial fluidity at a temperature of less than 180° F., commonly less than 170° F. or 160° F. Since the material must harden to hold the contact lens in a proper orientation, the material should have a melting point such that the material is substantially solid and mechanically stable at less than 130° F. For the purpose of this application, we believe the material should have a Brookfield viscosity of less than 500,000 cP, preferably less than 300,000 cP at 140° F., using spindle No. 29 in a thermosel viscometer, to meet these criteria including solidity at less than 130° F. If the material is not sufficiently fluid at 170° F., operating personnel can be made very uncomfortable in wiping excess adhesive if the melt temperature is substantially greater than 170° F. and at more elevated temperatures, can result in skin damage and other hazards.

The blocking composition of the invention contains an aqueous soluble polymer. Aqueous or water soluble polymer molecules or macro molecules that exhibit solubility in aqueous solutions represent a diverse class of polymers ranging from biopolymers to entirely synthetic resins. Water-soluble polymers that can be used in the compositions of the invention can include biopolymers, biopolymers containing synthetic groups, synthetic polymers in the form of nonionic, ionic, and other synthetic polymeric materials. The solution properties and solubility performance the water-soluble polymers are dictated by structural characteristics of the polymer chain and the interaction between the polymer chain and water in the solvating reaction. The polymer structure may derive from a single monomer such as polyethylene oxide or acrylic monomers or from mixtures of monomers. The polymers can take the form of random, alternating, or grafted copolymer structures. The secondary structure of water-soluble polymers is related to configuration intermolecular effects such as hydrogen bonding or ionic interactions. Tertiary structures involved in intermolecular and water—polymer interactions. Functional groups obtaining aqueous solubility in a polymer typically contain at least one functional group selected from amine groups, hydroxyl groups, sulfhydryl groups, carboxylic groups, sulfonic groups, phosphonic groups and other functional groups that can either be solvated by water or can react with water, or with a solvated reagent. Naturally occurring water-soluble polymers are typically polysaccharides or polysaccharide derivatives. Nonionic and anionic polymers useful in manufacturing the compositions of the invention include polyacrylamide, polyacrylic, polyacrylic acid, polymers and copolymers, etc., polyvinyl alcohol polymers in various states of hydrolysis, ranging from partially hydrolyzed to fully hydrolyzed and super hydrolyzed materials can be used. Poly(vinyl pyrrolidone) polymers can also be used. Ionic water soluble polymers include polyacrylic acid, poly (vinyl sulfonic) acid and the soluble salts thereof.

The preferred water-soluble polymer for use in the compositions of the invention comprises a water-soluble polyalkyleneimine polymer. Preferred polymers comprise a N-acyl substituted polyalkyleneimine (A PeOx or Aquazol polymer) correspond to the formula:

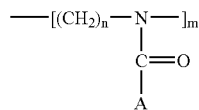

wherein A is $-R_3-(OR_2)_p-OR$, $-(CH_2)_q-C-OR$, $-(CH_2)_q-O-C-R$; or $-R$; m is 50–10000, n is about 2–6; p is about 0–3; q is about 1–15; R is a $C_1-C_{15}$ substantially hydrocarbon radicals such as alkyl, alkyl substituted aryl, etc., including such groups as methyl, ethyl, isobutyl, pentyl, cyclohexyl, 2-ethyl-hexyl-dodecyl, naphthyl, tolyl, benzyl, chloromethyl, fluoroethyl, chlorophenyl and phenylethyl; and $R_2$ and $R_3$ are selected from the group consisting of divalent hydrocarbon and substituted hydrocarbon radicals such as alkylene and arylene. Specific examples of $R_2$ and $R_3$ groups include methylene, ethylene, tetramethylene; ortho-, meta- and para-phenylene; tolylene $(C_6H_4CH_2-)$, chloroethylene, fluoroethylene, and chlorophenylene.

The most preferred polymer comprises a polyethylene oxazoline polymer corresponding to the formula:

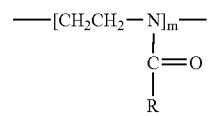

wherein R is defined hereinabove, m is about 50–10,000, preferably about 100–7500. Most preferably, the monomer making up the substituted polyalkyleneimine comprises a $C_{1-5}$ alkyl substituted-2-oxazoline. In other words, in the formula n is about 2. The molecular weights of these polymers range from about 40,000 to 500,000 and greater. The polymers available in low (100,000 or less), moderate (100,000 to 250,000) and high (greater than about 300,000) molecular weight. The most preferable polyoxazoline polymers of the invention, for reason of low cost and rapid solubility in the presence of the aqueous soluble salt, are polymers having the formula above wherein m is about 50–8000, R is a $C_{1-12}$ alkyl group, preferably a $C_{1-5}$ alkyl, including a poly(2-ethyl-2-oxazoline; CAS Number 25806-17-1) with a low molecular weight and Kinematic Viscosity of less than 10 cSt.

The absorbent disintegrant of the present invention is water swellable, partially soluble or insoluble polymer, typically a copolymer derived at least in part from aqueous soluble monomer(s); but can be crosslinked to improve water insolubility. The absorbent disintegrant is typically not freely water soluble. Mixtures of monomers can also be polymerized to obtain copolymers or terpolymers and polymers presenting a wide variety of monomer. If not crosslinked, as by polymerizing in mixture with polyfunctional, crosslinking monomer, these copolymers can be water-soluble. In the present invention, crosslinked polymers otherwise as described above, and co polymer and terpolymers are used.

When it is desired to obtain recurring anionic character, such as carboxyl and carboxylate, sulfonate and sulfonic bearing groups, and the like, the synthetic route of choice may not call for the monomers bearing such anionic groups. Crosslinking helps maintain an insoluble material in the present invention and is readily achieved in manners known in the polymer arts; as, by irradiation, or the incorporation into a monomer mixture to be polymerized of known chemical crosslinking monomeric agents such as divinylbenzene, the divinylether of diethylene glycol, N,N'-methylene bisacrylamide; and the like. The manner of crosslinking is not critical. In contact with water the absorbent disintegrant absorbs water and swells. The aqueous swollen polymer binds water tightly to disrupt the blocking compound accelerating removal.

The water insoluble absorbent particles used in accordance with the present invention are presently known materials, generally being polymer material having a substantial portion of its molecular structure composed of hydrophilic groups, and whose polymeric network has been crosslinked to introduce a limited water insolubility into the molecule. Suitable water insoluble absorbent material in accordance with the invention have a minimum average molecular weight of about 10,000 and a maximum molecular weight of about 300,000. Preferably, the extent of crosslinking is contained so that the polymeric network is not substantially soluble in water, but swells as water and other liquid is absorbed within its structure. As the polymer swells it maintains the approximate shape and geometry it had before contact with liquid, but the dimensions thereof are greatly enlarged to provide for the binding of the liquid absorbed therein and the disintegration of the blocking compound.

The water insoluble absorbent material that may be used in accordance with the present invention preferably is a crosslinked polyacrylamide or a crosslinked sulfonated polystyrene or a mixture of these acrylamides and polystyrenes. The crosslinked polyacrylamide material of the invention may be prepared by known techniques, e.g., by crosslinking a linear polyacrylamide (or by copolymerizing an acrylamide) with a non-conjugated divinyl compound such as methylene bis-acrylamide. In the latter case, the polymerization may be run by any of the standard methods including the use of peroxide catalysts. The crosslinking compound may be present in an amount of from about 500 to about 5,000 parts per million of polymerizate. Other examples of non-conjugated divinyl crosslinking compounds are 1,4-divinyl benzene; N,N-diallylacrylamide; diallylamine; diallylmethacrylamide; 2,5-dimethyl-1,7-octadiene; p,p'-diisopropenylbenzene; 2,8-dimethyl-1,8-nonadiene and diethylene glycol divinyl ether. Crosslinked polystyrene sulfonate absorbent materials may be used in accordance with the invention. The absorbent materials are small particle size materials that are suspended in the hot-melt blocking compound forming a particulate phase distinct from the melt compound. The preferred materials have a particle size less than about 200 microns to obtain a smooth melt form of the material but avoiding plugging phase separation in production and use equipment. The absorbent particle size is often about 10 to 150 microns, and can be about 50 to 120 microns. The absorbent can absorb about 50 to 100 grams of water, often about 150 to 500 grams of water per gram of absorbent.

Preferred super absorbent polymer materials used in the most readily dispersed and solubilized blocking compositions include polymers such as AQUA KEEP 10SH-NF® super absorbent material. This material is a non-soluble water swell able acrylic polymer material having a particle size less than 150 microns. The material has a bulk density of 0.67 grams-milliliters$^{-1}$ and absorbs 10 to 75 grams of water per gram of absorbent. Other useful types of super absorbent polymeric material include VIVAPUR® Type 105 microcrystalline cellulose, Ac-Di-Sol sodium carboxymethylcellulose (internally crosslinked) super absorbent polymer.

Based on our expansion of the product, we find that the preferred super absorbent polymer materials are particles in which the individual particles are spherical in nature. Further, upon absorption of water, the spherical particles swell, but remain spherical even when absorbing substantial amounts of water. Such a particle aids in controlling melt viscosity of the overall blocking composition since spherical particles tend not to increase viscosity to undesirable levels.

The contact lens blocking compound of the invention can contain a highly soluble inorganic salt to help in promoting removal of the blocking compound from the finished lens after lathe shaping. The highly soluble salt has a solubility greater than 1 gram per liter. Typical salts comprise highly soluble salts of strong mineral acid. Such acids include HCl, sulfuric acid, nitric acid, trichloroacetic acid, and other acid having a pKa less than 6 or less than 3, often less than 2 in a solution about 0.1% at room temperature. Examples of suitable salts include sodium chloride, potassium chloride, sodium nitrate, potassium nitrate, sodium sulfate, ammonium chloride, potassium sulfate, potassium hydrogen sulfate and other similar highly soluble salts. Salts that are in the form of highly divided particulate materials having a particle size less than 150 microns or less than 100 microns are particularly useful. Such results are referred to as "micronized" particulate materials. We have found that the highly soluble salts of the invention promote rapid solution of the blocking compound substantially in excess of materials such as titanium dioxide, calcium carbonate, aluminum oxide, silica or other common polymeric fillers.

The blocking compound of the invention comprises a major amount of the water soluble polymer material combined with a highly soluble inorganic salt. One useful salt is common table salt (NaCl) having a particle size greater than about 280 microns. Preferred highly soluble salts include salts having a particle size less than about 150 microns typically between about 5 and 90 microns. These small particle size materials are characterized as "micronized" salts. The aqueous soluble blocking compositions of the invention contain a sufficient but effective amount of the micronized salt to permit the aqueous cleaning fluid to rapidly penetrate the polymer mass, dissolve the salt and the polymer material in a rapid cleaning step.

Ultrafine, food grade sodium chloride is produced by micropulverizing vacuum granulated salt. Salt particles are jagged fragments of cubes, exhibiting an extremely high specific surface area and low bulk density. A small amount of ultrafine (8 microns) tricalcium phosphate is added to prevent caking, but the products do not readily free-flow and tend to be exceptionally dusty. The material can be ground to less than 200 mesh (75 microns) or to less than 325 mesh (45 microns).

Tricalcium phosphate is water insoluble at neutral pH, slightly soluble in acid solution. It has GRAS approval as an anti-caking agent and is exempt from label declaration on foods incorporating the salt as an incidental, non-functional additive under 21 C.F.R. 101.100(a)(3). A small amount (less than 3%) of this material has no impact in solubility of the salt or performance in the blocking compound.

TABLE 1

Salt Filler Chemical Analysis

|  | Typical | Range |
|---|---|---|
| [1]Sodium Chloride (%) | 98.0 | 87.6–98.4 |
| Calcium Sulfate (%) | 0.2 | 0.05–0.55 |
| [2]Other Salts (%) | 0.04 | 0.02–0.07 |
| Moisture (%) | — | <0.1 |
| Copper (ppm) | 0.1 | <0.5 |
| Iron (ppm) Free | 0.3 | <1.0 |
| [3]Complexed | 4 | 4–6 |
| Tricalcium Phosphate (%) | 1.75 | 1.5–2.0 |

[1]By difference of impurities and additives, moisture-free basis (ASTM)
[2]$Na_2SO_4$, $CaCl_2$, $MgSO_4$
[3]Contributed by tricalcium phosphate

TABLE 2

Analytical Content (per 100 g)

| Ash (g) | >99.9 |
|---|---|
| Calcium (mg) | 760 |
| Chloride (g) | 59.4 |
| Iodine (ug) | <100 |
| Magnesium (mg) | 5 |
| Potassium (mg) | 3 |
| Sodium (g) | 38.5 |

TABLE 3

Salt Physical Properties

| Grade | Microns | Bulk Density* (g/ml) | Mean Crystal Size (um) | Mean Surface Area (cm²/g) |
|---|---|---|---|---|
| 200 mesh | 75 | 0.6–0.8 | 35 | 1,900 |
| 325 mesh | 45 | 0.56–0.7 | 25 | 2,500 |

*Loose pour

TABLE 4

Sieve Analysis

| U.S. Mesh | Opening Microns | Percent Retained** | | | |
|---|---|---|---|---|---|
| | | Typical | Range | E.F. 200 Rittman Typical | Range |
| E.F. 200 Hutchinson | | | | | |
| 100 | 150 | Tr | Tr | Tr | Tr |
| 200 | 75 | 4 | <10 | Tr | <10 |
| 325 | 45 | 15 | 15–22 | 10 | 5–28 |
| 400 | 38 | — | — | 9 | 5–19 |
| Pan | — | 81 | 73–89 | 81 | 60–92 |
| E.F. 325 | | | | | |
| 200 | 74 | Tr | Tr | | |
| 325 | 44 | 2 | <5 | | |
| 400 | 37 | 4 | 1–9 | | |
| Pan | — | 94 | 86–96 | | |

*25,400 microns (micrometers, um) per inch.
**On individual screens.

Certain formulations can also comprise an effective amount of an inorganic extender or filler, such as calcium carbonate, zinc oxide, alumina, clays, titanium dioxide, talc, carbon black and the like. For example, the adhesives formulated to be moisture-sensitive and or repulpable can comprise up to about 25 wt-% of a mineral extender which is preferably fatty acid ester coated to increase its organophilicity. One commercially-available filler of this type is the stearate-calcium carbonate compound (Omya, Inc., Proctor, Vt.). The filler material can also function to reduce (if desired) the pressure-sensitivity of the moisture-activated adhesives of the present invention.

The blocking composition of the invention can typically comprise up to 95% of the water soluble polymer composition combined with about 0.5 to 50 wt % of the absorbent disintegrant or about 0.5 to 40 wt % of the water soluble salt. One preferred composition of the invention comprises about 15 to 55 wt % of the polyalkyloxazoline polymer of the invention combined with an absorbent disintegrant or a water soluble salt material. Lastly, the most preferred compositions of the invention comprise about 25 to 45 wt % of the polyethyloxazoline composition, about 30 to 50 wt % of a hydrophilic (hydroxyl substituted or amine substituted additive material) compound and about 2 to 40 wt % of the absorbent disintegrant or about 15 to 35 wt % of a sodium or potassium salt of a strong acid. The absorbent is preferably in the form of a finely divided spherical particle less than 200 μm in diameter. The salt is preferably in the form of a micronized salt having a particle size less than about 90 or 75 microns.

The water soluble polymer of the material can be used in the form of a single polymer species, a blend of two or more polymers of similar composition differing in molecular weight or a blend of two or more polymers of differing types and molecular weights.

The blocking composition of the invention can also contain a hydrophilic additive material. Typically, the hydrophilic additive materials are hydroxyl (—OH), amine substituted (—NH$_2$) compounds that are at least mildly hydrophilic, if not fully water soluble. Such additive materials typically comprise common plasticizers or tackifying agents that can be combined with the polymer species of the invention to either extend the polymer, reduce viscosity, increase tack, increase the softness of the polymer, increase needle penetration properties or otherwise make the resulting blocking composition more amenable to contact lens blank or button imbedding and lathing practices. The resulting polymer materials must have a workable viscosity, must resist heat induced decomposition or physical property change and when used in a fixed structure, remain mechanically stable during machining.

The hot melt adhesives of this invention can contain a hydroxy substituted organic compound. The hydroxy substituted organic compound can be used to provide a number of functions to the composition. First, the combination of the organic properties and the hydroxy group in the compound promotes the formation of uniform homogenous single phase compositions. Further, the hydroxy substituted organic compounds tend to produce adhesives with a workable viscosity, a controlled rate of set and heat resistance. Lastly, the blending of sufficient quantities of the hydroxy substituted organic compounds in the hot melt adhesives of this invention can substantially reduce (if desired) the pressure-sensitive properties of the adhesive. The important aspects of the hydroxy substituted organic compound is that it contains one or more hydroxy groups attached to an essentially organic composition. The organic composition can be essentially aliphatic or aromatic. Many hydroxy substituted organic compounds exist including alcohols, hydroxy substituted waxes, polyalkylene oxide polymers (such as Carbowax.) and many others.

Preferred hydroxy substituted organic compounds include: $C_{10-30}$ fatty alcohols, hydroxy substituted waxes, hydroxy substituted fats, hydroxy substituted fatty acids, hydroxy substituted fatty amides, diacetin, polyalkylene oxide polymers having a molecular weight of less than about 2000, preferably about 1000, such as polyethylene oxide, polypropylene oxide and others. For compatibility purposes we have found that the hydroxyl number of the hydroxy substituted organic compound should be at least 160 or preferably between a 200 and 500, and that at a level of more than 20 wt % of a 160 hydroxyl member, hydroxywax, an effective amount, 5 to 10 wt %, of a $C_{8-20}$ fatty acid, preferably a $C_{8-20}$ saturated fatty acid can be used.

The hot melt adhesive compositions may also incorporate relatively small amounts of adjuvants such as UV absorbers, heat stabilizers, flavorings, release agents, additional anti-blocking agents and antioxidants. Typical antioxidants include the Irganox series (Ciba-Giegy) such as Irganox 1076, octadecyl-3,5-di-tert-butyl-4-hydroxy hydrocinnamate and the distearyl pentaerythritol diphosphite (Weston. 619, Borg-Warner Chemicals). When present, such adjuvants will commonly make up less than 5% by weight of the present adhesives.

The blend of additive materials of the invention can result in a workable material with controlled or absent tack, acceptable viscosity at elevated temperature and ease of cleaning when finished. Many hydroxy and amino substituted additive materials are available. Such hydroxy substituted additives include hydroxy substituted waxes, polyethylene oxide polymers, polypropylene oxide polymers, fatty alcohols, amine substituted waxes, hydroxy and amine substituted fats and fatty acids, hydroxy substituted fatty amides, polyethylene glycols, polypropylene glycols, and other materials.

The blocking composition of the invention can also contain conventional surfactants, tackifying agents and plasticizers. Many tackifying agents such as natural or synthetic resin and natural or synthetic resin blends are available including materials from Silvachem Corp., Schenectady Chemical Corp., Reichhold Chemical Inc., and Hercules Inc. These materials can be natural products including rosin acid, hydrogenated rosin acid, tall oil residues, polymerized olefins, alkyl resins, phenolic resins, terpene-phenol resins and others. Plasticizer materials typically are considered to be materials that increase flexibility, distendability, needle penetration or other softening aspects of the compositions of the invention. Plasticizers often lower viscosity of the melt composition and elastic modulus of the room temperature solids. Conventional ester plasticizers such as esters of adipic acid, azeleic acid, benzoic acid and citric acid can be used. Further, epoxides, glycolic acid esters, isophthalic acid esters, maleic acid esters, phosphate plasticizers, phthalate plasticizers, polyester plasticizers and others can be used. Preferred water insoluble plasticizers are any of the common benzoate or hydroxy benzoate materials. Such plasticizers include glycerol tribenzoate, glycerol diacetate, pentaerythritol benzoate, mixed benzoates, mixed phthalates and other plasticizers. Certain water soluble plasticizers can be helpful in the compositions such as liquid polyalkylene glycols, such as PEG materials having a molecular weight from about 200 to about 800. The contact lens blocking composition of the invention often contains a characteristic dye to aid in insuring that the material is fully removed from the contact lens after cleaning. Typical dyes can be incorporated into the blocking composition. Further, the invention can contain a variety of typical additives or adjuvants such as heat stabilizers, release agents, antioxidants, anti-blocking compounds and other such materials to aid in removing the contact lens from the material during aqueous cleaning steps.

The surfactant or surfactant admixture of the present invention can be selected from polymer compatible water-soluble or water dispersible nonionic, or anionic surface-active agents; or mixtures of each or both types. Nonionic and anionic surfactants offer diverse and comprehensive commercial selection, low price; and, most important, excellent detersive effect—meaning surface wetting. Surface—active or "wetting agents" function to increase the penetrant activity of the invention into the bulk polymer. Nonionic surfactants useful in the invention are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polydration adducts, or its mixtures with alkoxylenes such as propylene oxide to form a nonionic surface-active agent. The length of the hydrophilic polyoxyalkylene moiety that is condensed with any particular hydrophobic compound can be readily adjusted to yield a water dispersible or water soluble compound having the desired degree of balance between hydrophilic and hydrophobic properties.

Useful surfactants in the present invention include: Aerosol OT-B Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade name PLURONIC® manufactured by BASF Corp. PLURONIC® compounds are difunctional (two reactive hydrogens) compounds formed by condensing ethylene oxide with a hydrophobic base formed by the addition of propylene oxide to two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. TETRONIC® compounds are tetra-functional block copolymers derived from the sequential additional of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

Also useful nonionic surfactants include the condensation products of one mole of alkyl phenol wherein the alkyl constituent, contains from about 8 to about 18 carbon atoms with from about 3 to about 50 moles of ethylene oxide. The alkyl group can, for example, be represented by diisobutylene, di-amyl, polymerized propylene, isoctyl, nonyl, and di-nonyl. Examples of commercial compounds of this chemistry are available on the market under the trade name IGEPAL® manufactured by Rhone-Poulenc and TRITON® manufactured by Union Carbide.

Likewise useful nonionic surfactants include condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade name NEODOL® manufactured by Shell Chemical Co. and ALFONIC® manufactured by Vista Chemical Co.

Condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above delineated carbon atoms range or it can consist of an acid having a specific number of carbon atoms within the range. Examples of commercial compounds of this chemistry are available on the market under the trade name NOPALCOL® manufactured by Henkel Corporation and LIPOPEG® manufactured by Lipo Chemicals, Inc. In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention. All of these ester moieties have one or more reactive hydrogen sites on their molecule which can undergo further acylation or ethylene oxide (alkoxide) addition to control the hydrophilicity of these substances.

Other useful surfactants are nonionics made by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile comprising 10% by weight to about 80% by weight of the final molecule. These "reverse" PLURONIC®'s are manufactured by the BASF Corporation under the trade name PLURONIC® surfactants. Likewise, the TETRONIC® surfactants are produced by the BASF Corporation by the sequential addition of ethylene oxide and propylene oxide to ethylenediamine. The hydrophobic portion of the molecule weighs from about 2,100 to about 6,700 with the central hydrophile comprising 10% by weight to 80% by weight of the final molecule.

Tertiary water soluble amine oxide surfactants are selected from the coconut or tallow dimethyl amine oxides. Also useful in the present invention are surface active substances which are categorized as anionics because the charge on the hydrophobe is negative; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counterions) associated with these polar groups, sodium, lithium and potassium impart water solubility and are most preferred in compositions of the present invention. Examples of suitable synthetic, water soluble anionic compounds are the alkali metal (such as sodium, lithium and potassium) salts or the alkyl mononuclear aromatic sulfonates such as the alkyl benzene sulfonates containing from about 5 to about 18 carbon atoms in the alkyl group in a straight or branched chain, e.g., the salts of alkyl benzene sulfonates or of alkyl naphthalene sulfonate, dialkyl naphthalene sulfonate and alkoxylated derivatives. Other. anionic detergents are the olefin sulfonates, including long chain alkene sulfonates, long chain hydroxyalkane sulfonates or mixtures of alkenesulfonates and hydroxyalkane-sulfonates and alkylpoly (ethyleneoxy) ether sulfonates. Also included are the alkyl sulfates, alkyl poly (ethyleneoxy) ether sulfates and aromatic poly (ethyleneoxy) sulfates such as the sulfates or condensation products of ethylene oxide and nonyl phenol (usually having 1 to 6 oxyethylene groups per molecule).

TABLE 5

Water Soluble Polymer Compositions

| Component | Wt % | | |
|---|---|---|---|
| Water soluble Polymer | 5–95 | 10–70 | 20–50 |
| Hydroxy Comp. | up to 50 | 5–70 | 10–60 |
| Filler | up to 50 | 1–50 | 2–40 |
| Absorbent Polymer | up to 50 | 1–50 | 2–40 |

TABLE 5-continued

Water Soluble Polymer Compositions

| Component | Wt % | | |
|---|---|---|---|
| Water Soluble Filler | up to 50 | 1–50 | 2–45 |
| Surfactant | 0 | 0.01–2.0 | 0.1–1 |
| Plasticizer | 0 | 0.1–10 | 0.2–5 |
| Tackifier | 0 | 0.1–10 | 0.2–5 |

TABLE 6

Aquazol or PeOx Compositions

| Component | Wt % | | |
|---|---|---|---|
| Water soluble PeOx Polymer | 10–75 | 10–70 | 20–50 |
| Hydroxy Comp. | up to 50 | 5–70 | 10–60 |
| Filler | up to 50 | 1–50 | 2–40 |
| Absorbent Polymer | up to 50 | 1–50 | 2–40 |
| Water Soluble Filler | 0.1–50 | 1–50 | 2–45 |
| Surfactant | 0 | 0.01–2 | 0.1–1 |
| Plasticizer | 0 | 0.1–10 | 0.2–5 |
| Tackifier | 0 | 0.1–10 | 0.2–5 |

The invention is exemplified by the following initial formulations that are made by heating with stirring, at elevated temperature of about 325° F., the steryl or cetyl alcohol, adding the Aquazol-50 polymer followed by the salt and then other components.

EXAMPLE 1

| INGREDIENT | PERCENT (%) |
|---|---|
| Polyethylene Oxazoline (Aquazol-50) 50,000 mw; 6.9 cSt K. Viscosity | 35 |
| Crodacol S95 (stearyl alcohol) | 40 |
| Micronized sodium chloride | 25 |

EXAMPLE 2

| INGREDIENT | PERCENT (%) |
|---|---|
| Polyethylene Oxazoline (Aquazol-50) 50,000 mw; 6.9 cSt K. Viscosity | 35 |

-continued

| INGREDIENT | PERCENT (%) |
|---|---|
| Stearyl Alcohol | 30 |
| Foral WA tackifier | 10 |
| Micronized sodium chloride | 25 |

EXAMPLE 3

| INGREDIENT | PERCENT (%) |
|---|---|
| Polyethylene Oxazoline (Aquazol-50) 50,000 mw; 6.9 cSt K. Viscosity | 27 |
| Cetyl Alcohol | 35.3 |
| Micronized sodium chloride | 35.5 |
| Aerosol OT-B | 2 |
| Irganox 1010 | 0.2 |

EXAMPLE 4

| INGREDIENT | PERCENT (%) |
|---|---|
| Polyethylene Oxazoline (Aquazol-50) 50,000 mw; 6.9 cSt K. Viscosity | 20 |
| EF-325 | 30 |
| Cetyl Alcohol | 29 |
| Aqua Keep 10SH-NF | 19.5 |
| Aerosol OT-B | 1 |
| Irganox 1010 | 0.5 |

-continued

| INGREDIENT | PERCENT (%) |
|---|---|
| Viscosity @ 140° F. | 68,200 |
| Viscosity @ 150° F. | 48,750 |

EXAMPLE 5

| INGREDIENT | PERCENT (%) |
|---|---|
| Polyethylene Oxazoline (Aquazol-50) 50,000 mw; 6.9 cSt K. Viscosity | 15 |
| EF-325 | 32 |
| Cetyl Alcohol | 30 |
| Aqua Keep 10SH-NF | 19.5 |
| Aerosol OT-B | 3 |
| Irganox 1010 | 0.5 |
| Viscosity @ 140° F. | 4,200 |
| Viscosity @ 150° F. | 3,000 |

These formulations are substantially more soluble in water, are more easily removed from the finished contact lens and as a result improves productivity and processing of the contact lens materials.

We have found that the in addition to the slower set time associated with the Bonafini Jr material, its performance when tooling lenses with higher curvatures often fails. The lenses often separate before and during machining. We have been told that it is too soft even when fully set. With this information we tested the Kerr (non water soluble) control wax, Bunnelle et al., example IV, Bonafini Jr. and Examples 3, 4 and 5 for hardness using a Shore A hardness tester. The results are below.

| | Shore A Hardness | | | | | |
|---|---|---|---|---|---|---|
| | Kerr Wax | Bunnelle et al., U.S. Pat. No. 5,459,184, Example IV | Bonafini Jr | Example 3 | Example 5 | Example 4 |
| 1 | 82 | 88 | 67 | 90 | 88 | 92 |
| 2 | 77 | 88 | 64 | 92 | 82 | 90 |
| 3 | 80 | 87 | 62 | 88 | 88 | 90 |
| 4 | 78 | 88 | 64 | 87 | 87 | 91 |
| 5 | 82 | 85 | 62 | 88 | 80 | 93 |
| Average | 79.8 | 87.2 | 63.8 | 89 | 85 | 91.2 |
| Std. Dev. | 2.4 | 1.3 | 2 | 2 | 3.7 | 1.3 |

As you can see the Bonafini Jr. Wax is indeed softer than the other materials.

We also tested the rate at which these materials dissolved in warm 120 ° F. tap water. In order to test this, we coated each material onto release liner at 140 ° F. using a hot Baker Bar set at 3 mils (the Bunnelle et al example IV was coated at 180 ° F. due to its higher softening point). We then measured the average time for an approximate 1"×1" piece of each material to breakdown or dissolve. The results follow:

| | Time to dissolve in 120° F. Water | | | | |
|---|---|---|---|---|---|
| | Bunnelle et al., U.S. Pat. No. 5,459,184, | | | | |
| | Kerr Wax | Example IV | Bonafini Jr | Example 3 | Example 5 | Example 4 |
| Time (sec) | Insoluble | 1800 | 10 | 600 | 10 | 10 |

These results are in line with the industry information we have been able to obtain regarding the Bonafini Jr. Wax (trade name "Boston Wax"). That is that it dissolves quickly but is too soft and sets too slow for most applications. That the Kerr red (industry standard wax) sets fast enough and is hard enough for all machining operations but needs to be removed with chlorinated solvents. And our new materials that include SAP or other types of disintegrants match the machining, set time and adhesion of the Kerr red wax but can quickly be dissolved in warm water. The addition of a disintegrant, in this case SAP, clearly is an improvement over our initial application (example 3) in how quickly it dissolves in warm water.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A water soluble thermoplastic hot melt blocking composition for contact lens manufacture, the composition comprising:
    (a) about 10 to 95 wt % of a water soluble polymer composition; and
    (b) about 1 to about 50 wt % of a anionic polymeric absorbent disintegrant.

2. The composition of claim 1 wherein the anionic polymeric absorbent disintegrant comprises a polymer comprising monomer units of acrylamide.

3. The composition of claim 2 wherein the anionic polymeric absorbent disintegrant polymer is crosslinked.

4. The composition of claim 1 wherein the water soluble polymer comprises a poly(ethylenegycol) in an amount of about 15 to 75 wt. %.

5. The composition of claim 1 wherein the water-soluble polymer comprises a poly (vinyl pyrrolidone) in an amount of about 15 to 75 wt. %.

6. A water-soluble thermoplastic hot melt blocking composition for contact lens manufacture, the composition comprising:
    (a) about 25–50 wt % of a water soluble alkyl substituted polyethyleneimine polymer;
    (b) about 5 to 50 wt-% of a anionic polymeric absorbent disintegrant; and
    (c) about 5 to about 50 wt % of a water soluble sodium or potassium salt of a strong acid.

7. The composition of claim 6 additionally comprising about 10–50 wt % of a hydroxy substituted organic compound comprising a hydroxywax having hydroxy number of greater than 150.

8. The composition of claim 6 wherein the alkyl substituted polyethyleneimine polymer comprises a compound of the formula:

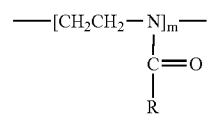

wherein R is a $C_{1-5}$ alkyl, m is about 50–10,000.

9. The composition of claim 6 wherein there is about 25 to 40 wt % of the water soluble polymer, about 5 to 50 wt % of a anionic polymeric absorbent disintegrant, about 15 to 45 wt % of a hydroxywax and about 15 to 45 wt % of a water soluble micronized sodium chloride or potassium chloride salt.

10. The composition of claim 6 wherein the particle size is less than about 150 microns.

11. The composition of claim 6 additionally comprising a surfactant.

12. The composition of claim 6 wherein the composition comprises about 10–50 wt % of a hydroxy substituted organic compound.

13. The composition of claim 12 wherein the hydroxy substituted organic compound comprises hydroxywax.

14. A water soluble thermoplastic hot melt blocking composition for contact lens manufacture, the composition comprising:
    (a) about 10–90 wt % of a water soluble polymer composition;
    (b) about 1–50 wt % of a hydroxy substituted organic compound
    (c) about 5–50 wt % of a anionic polymeric absorbent disintegrant; and
    (c) about 1–50 wt % of an inorganic filler material;
wherein the components are blended such that the material is a structural solid at a temperature of less than about 130° F. and wherein the material is substantially melt form at a temperature greater than 140° F.

15. The composition of claim 14 wherein the composition is a solid at less than 120° F.

16. The composition of claim 14 wherein the composition is a melt at a temperature greater than 165° F.

17. The composition of claim 14 wherein the hydroxy substituted organic compound comprises about 5–50 wt % of a hydroxy wax.

18. The composition of claim 14 wherein the water-soluble polymer comprises an alkyl substituted polyethyleneimine polymer comprising a compound of the formula:

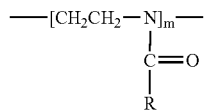

wherein R is a $C_{1-5}$ alkyl, m is about 50–10,000 and is present in an amount of about 15 to 75 wt. %.

19. The composition of claim 14 wherein the inorganic filler comprises a sodium or potassium salt of a strong acid.

20. The composition of claim 14 wherein the water-soluble polymer comprises a polyethyl oxazoline polymer having a molecular weight of about 10,000 to 500,000 and is present in an amount of about 15 to 45 wt %.

21. The composition of claim 14 wherein the inorganic filler comprises a particle size less than about 150 microns.

22. The composition of claim 14 wherein the hydroxy substituted organic compound has a hydroxy number of greater than 150.

23. The composition of claim 14 wherein the composition comprises a surfactant.

24. A water soluble thermoplastic hot melt blocking composition for contact lens manufacture, the composition comprising:
(a) about 10 to about 95 wt % of a polyalkyleneimine polymer; and
(b) about 1 to about 50 wt % of a anionic polymeric absorbent disintegrant.

25. The composition of claim 24, wherein the polyalkyleneimine polymer is a polyethylene oxazoline polymer.

26. The composition of claim 25, wherein the polyethylene oxazoline polymer has a molecular weight of about 10,000 to 500,000 and is present in an amount of about 15 to 45 wt. %.

27. The composition of claim 24, wherein the anionic polymeric absorbent disintegrant comprises a polymer comprising monomer units of acrylamide.

28. The composition of claim 27, wherein the anionic polymeric absorbent disintegrant polymer is crosslinked.

29. The composition of claim 24, further comprising a water soluble sodium or potassium salt of a strong acid.

30. The composition of claim 24, further comprising an inorganic filler.

31. The composition of claim 24, further comprising an a hydroxy substituted organic compound.

32. The composition of claim 31, wherein the hydroxy substituted organic compound is an hydroxywax.

33. The composition of claim 32 wherein the hydroxywax has a hydroxy number of greater than 150.

34. The composition of claim 24 additionally comprising a surfactant.

35. The composition of claim 24 additionally comprising an adjuvant.

36. The composition of claim 35, wherein the adjuvant is selected from the group consisting of a dye, a UV absorber, a licat stabilizer, a flavoring, a release agent, an additional antiblocking agent, an antioxidant, or mixtures thereof.

37. The composition of claim 24 wherein the composition is a solid at less than 120° F.

38. The composition of claim 24 wherein the composition is a melt at a temperature greater than 165° F.

* * * * *